United States Patent
Pincemin

(10) Patent No.: US 7,983,571 B2
(45) Date of Patent: Jul. 19, 2011

(54) APPARATUS AND METHOD FOR VERY HIGH DATA RATE OPTICAL TRANSMISSION, AND THE USE OF SAID APPARATUS AND SAID METHOD

(75) Inventor: Erwan Pincemin, Gommenech (FR)

(73) Assignee: France Telecom, Paris (FR)

( * ) Notice: Subject to any disclaimer, the term of this patent is extended or adjusted under 35 U.S.C. 154(b) by 670 days.

(21) Appl. No.: 10/544,251

(22) PCT Filed: Jan. 29, 2004

(86) PCT No.: PCT/FR2004/000205
§ 371 (c)(1),
(2), (4) Date: Oct. 12, 2006

(87) PCT Pub. No.: WO2004/079952
PCT Pub. Date: Sep. 16, 2004

(65) Prior Publication Data
US 2007/0172170 A1 Jul. 26, 2007

(30) Foreign Application Priority Data
Feb. 7, 2003 (FR) ...................... 03 01444

(51) Int. Cl.
*H04B 10/04* (2006.01)
*H04B 10/12* (2006.01)

(52) U.S. Cl. ...................... 398/193; 398/194

(58) Field of Classification Search ............... 398/193
See application file for complete search history.

(56) References Cited

U.S. PATENT DOCUMENTS

| 4,918,751 | A | 4/1990 | Pessot et al. |
| 5,596,667 | A | 1/1997 | Watanabe |
| 5,737,460 | A | 4/1998 | Damen et al. |
| 5,812,729 | A * | 9/1998 | Allison et al. ............... 385/142 |
| 5,912,749 | A * | 6/1999 | Harstead et al. ............... 398/75 |
| 6,201,916 | B1 | 3/2001 | Eggleton et al. |
| 6,249,630 | B1 * | 6/2001 | Stock et al. ................ 385/123 |
| 6,418,256 | B1 | 7/2002 | Danziger et al. |
| 2001/0017969 | A1 | 8/2001 | Kato |
| 2001/0055455 | A1 | 12/2001 | Hasegawa et al. |
| 2002/0036812 | A1 * | 3/2002 | Bai ........................... 359/124 |
| 2002/0176676 | A1 * | 11/2002 | Johnson et al. ............... 385/125 |
| 2004/0062552 | A1 * | 4/2004 | Moeller ...................... 398/147 |

FOREIGN PATENT DOCUMENTS

| EP | 0504834 A2 | 9/1992 |
| GB | 2299473 | 10/1996 |
| JP | 8288904 | 11/1996 |
| WO | WO 01/59496 | 8/2001 |
| WO | WO 02/59663 | 8/2002 |

* cited by examiner

*Primary Examiner* — Nathan M Curs
(74) *Attorney, Agent, or Firm* — Robert L. Epstein; Epstein Drangel LLP

(57) ABSTRACT

The apparatus includes a pulse emitter and at least one line fiber for conveying at least one pulse in the line fiber. A spreader module for linearly spreading pulses is provided including a propagation medium that is dispersive and linear. The propagation medium presents accumulated chromatic dispersion that is high enough to lower the peak power of the pulse to below a predetermined threshold, where a signal above the threshold is subjected to non-linear distortion in the line fiber. The spreader module is disposed between the emitter and the line fiber.

8 Claims, 2 Drawing Sheets

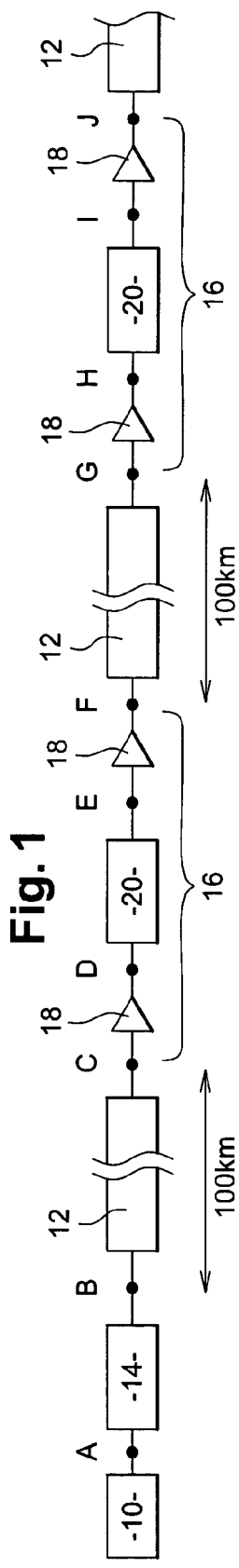
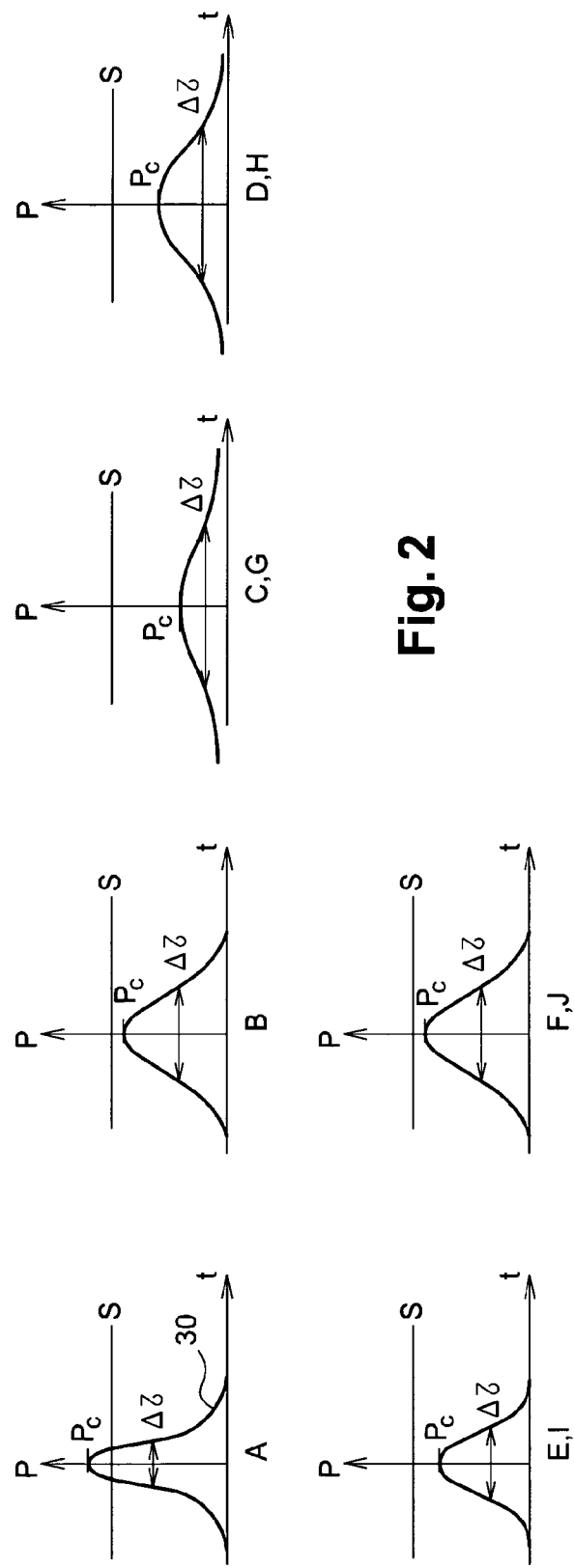
Fig. 1
Fig. 2

APPARATUS AND METHOD FOR VERY HIGH DATA RATE OPTICAL TRANSMISSION, AND THE USE OF SAID APPARATUS AND SAID METHOD

The present invention relates to apparatus for transmitting a signal through an optical data transmission network. The invention also relates to a corresponding transmission method and to the use of said apparatus and said method.

More precisely, the invention relates to apparatus for transmitting through an optical data transmission network, the apparatus being of the type comprising a pulse emitter and at least one line fiber for conveying at least one pulse in said line fiber.

Such a transmission device is known and is used for transmission at a very high data rate, e.g. at 40 gigabits per second (Gbit/s) or faster. Recently, attempts have been made to use apparatus of this type for transmission at a rate as high as or faster than 160 Gbit/s.

At such rates, non-linear distortion of the signal can appear. Such distortion greatly increases transmission errors. In particular, there can be very severe consequences on transmission quality due to known intra-channel non-linear effects of the self-phase modulation (SPM) type, of the intra-channel cross-phase modulation (ICXPM) type, of the intra-channel four-wave mixing (ICFWM) type, and of the intra-channel stimulated Raman scattering (ICSRS) type.

One solution for reducing the accumulation of non-linear distortion consists in replacing a line fiber situated between two amplifier devices by a succession of optical fiber portions comprising, in alternation, chromatic dispersion that is positive and negative, and with a short period. That solution is complicated and not very practical in use. Alternating different types of fiber within a cable is technically complex. Furthermore, that presents the drawback of making it more difficult to take action in the event of a cable breaking between two amplifier devices, since it is then no longer easy to know which type of cable is to be replaced.

An object of the invention is to remedy those drawbacks by providing transmission apparatus capable of transmitting a signal without non-linear distortion, and at lower cost, even at a very high data rate.

The invention thus provides transmission apparatus of the above-specified type, characterized in that it comprises a spreader module for linearly spreading pulses, said spreader module comprising a propagation medium that is dispersive and linear, said propagation medium presenting accumulated chromatic dispersion that is high enough to lower the peak power of the pulse to below a predetermined threshold, where a signal above said threshold is liable to be subjected to non-linear distortion in the line fiber, said spreader module being disposed between the emitter and the line fiber.

A signal is subjected to non-linear distortion in the line fiber specifically when the instantaneous power of the signal exceeds a certain threshold.

Thus, the transmission device of the invention constrains the pulse to propagate through a medium that is dispersive and linear prior to allowing the pulse to be conveyed in the line fiber, so that the peak power of the pulse is lowered sufficiently to be situated beneath said threshold when the pulse enters the line fiber, thereby guaranteeing that all subsequent distortion of the signal within the line fiber will be linear.

Transmission apparatus of the invention may further comprise one or more of the following characteristics:
  the spreader module comprises a fiber of the high order mode (HOM) type, of the super large effective area (SLA) type, or having photonic crystals;
  the device includes a plurality of amplifier modules disposed regularly along the line fiber, each including a dispersion compensation module comprising a propagation medium that is dispersive and linear; and
  the dispersion compensation module comprises a fiber of the HOM type, the SLA type, or having photonic crystals.

The invention also provides the use of transmission apparatus as described above for an optical network having a data rate of not less than 160 Gbit/s.

The invention also provides a method of transmitting a signal through an optical data transmission network, the method comprising the steps consisting in emitting at least one pulse and in conveying said pulse via an optical data transmission network comprising at least one line fiber, the method being characterized in that it further comprises, prior to conveying the pulse to the line fiber, a step consisting in causing the pulse to be conveyed by a propagation medium that is dispersive and linear, said propagation medium presenting accumulated chromatic dispersion that is high enough to lower the peak power of the pulse to below a predetermined threshold, where a signal above said threshold is liable to be subjected to non-linear distortion in the line fiber.

A transmission method of the invention may further comprise the characteristic whereby for a transmitted pulse that is amplified by amplifier modules disposed regularly along the line fiber, the pulse is conveyed within the amplifier modules in a propagation medium that is dispersive and linear, in order to compensate the dispersion to which the pulse has been subjected in the line fiber.

Finally, the invention provides the use of a method as described above for optical transmission at a data rate of not less than 160 Gbit/s.

The invention will be better understood with the help of the following description given purely by way of example and made with reference to the accompanying drawings, in which:

FIG. 1 shows optical transmission apparatus of the invention;

FIG. 2 shows the appearance of a pulse propagating through the FIG. 1 optical transmission apparatus.

Figure 3:
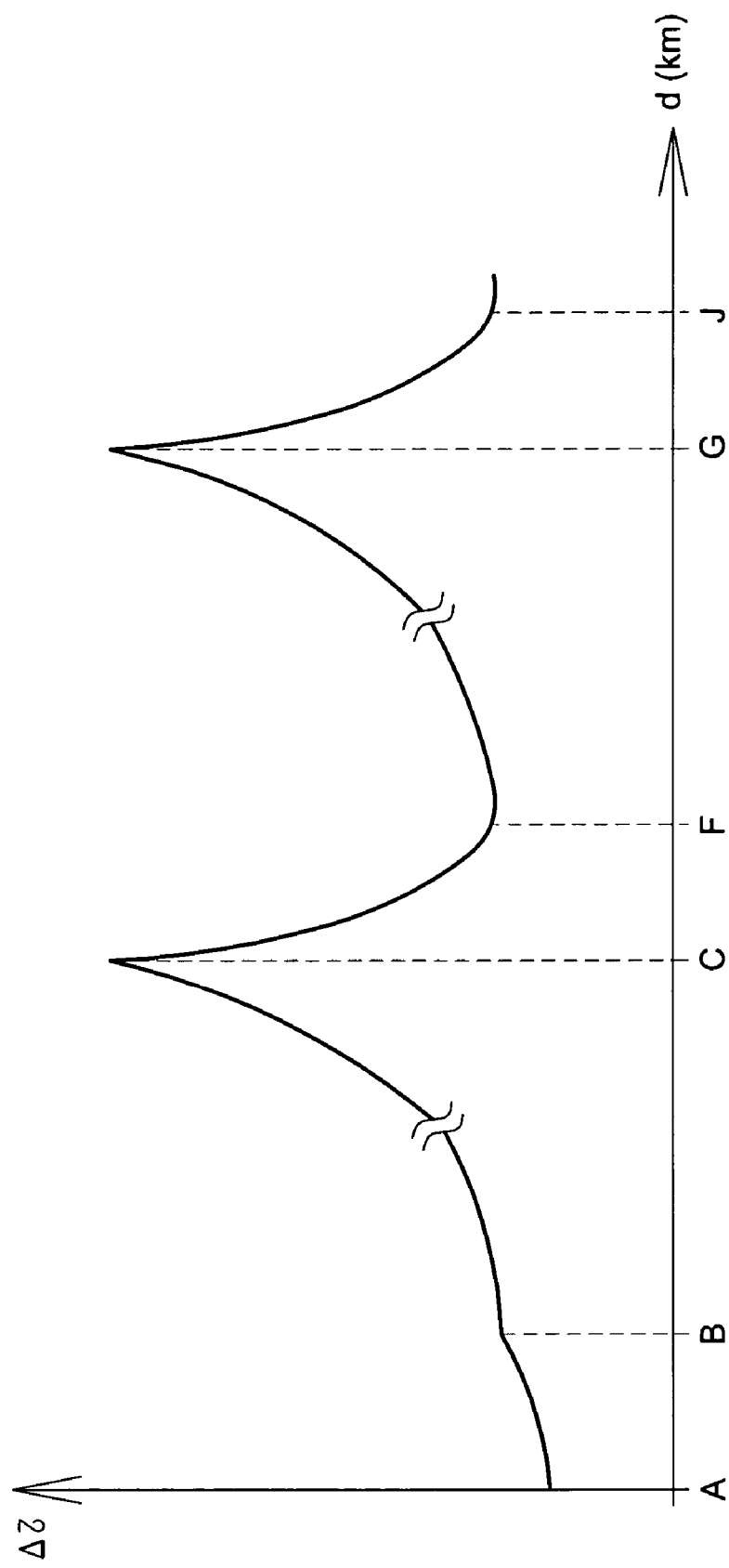
FIG. 3 is a diagram representing variation in the time width of a pulse propagating in the FIG. 1 optical apparatus.

The apparatus shown in FIG. 1 comprises a pulse emitter 10 adapted to emit signals at a very high data rate into a line optical fiber 12.

The line optical fiber 12 is constituted, for example, by a fiber of the standard single mode fiber (SSMF) type complying with the ITU G.652 standard.

The signal within the transmission apparatus is multiplexed in conventional manner by optical time division multiplexing (OTDM) or by wavelength division multiplexing (WDM).

The apparatus further comprises a spreader module 14 for linearly spreading pulses, said module comprising a propagation medium that is dispersive and linear, and that is characterized by a predetermined chromatic dispersion coefficient.

In this type of medium, even at very high data rates, non-linear effects are considerably reduced. These effects occur only at signal powers well above those at which the same effects are likely to occur in the line fiber 12.

By way of example, the spreader module 14 may comprise an optical fiber of the higher order mode (HOM) type, of the super large effective area (SLA) type, or a photonic crystal fiber.

For example, in order to transmit pulses 10 having a half-height time width of 2 picoseconds (ps) at 160 Gbit/s, the spreader module 14 is selected to comprise an optical fiber that presents an accumulated dispersion of 5.4 picoseconds per nanometer (ps/nm) for a spreading factor of 2, of 8.9 ps/nm for a spreading factor of 3, of 12.2 ps/nm for a spreading factor of 4, of 15.4 ps/nm for a spreading factor of 5, or indeed of 31.2 ps/nm for a spreading factor of 10, depending on the desired result. These calculations are known to the person skilled in the art and are not described in greater detail.

The module 14 for linearly spreading pulses is disposed between the pulse emitter 10 and the line fiber 12.

In regular manner, for example once every 100 kilometers (km), the line fiber is interrupted and an amplifier module 16 is inserted in the line fiber 12. In conventional manner, the amplifier module comprises at its input and at its output two amplifiers 18 having inserted between them a dispersion compensation module 20 of the same type as the spreader module 14.

Like the spreader module 14, the dispersion compensation module 20 comprises a propagation medium that is dispersive and linear. It may thus likewise comprise an optical fiber of the HOM type, of the SLA type, or having photonic crystals.

Whether a signal is subjected to time spreading, or on the contrary to time concentration in a dispersion medium depends on the properties of the signal at the inlet to the medium and on the properties of the medium through which the signal has previously passed, and in particular on the sign of its dispersion coefficient. The person skilled in the art knows how to select the parameters for each propagation medium, whether in the line fiber 12, in the module 14 for linearly spreading pulses, or in the dispersion compensation module 20, in order to achieve time spreading or concentration of the pulse conveyed, and this is therefore not described in greater detail herein.

The general appearance of a pulse 30 emitted by the emitter 10 is shown in FIG. 2, for various locations along the transmission apparatus.

At A, i.e. at the outlet from the emitter 10, the pulse 30 has a peak power $P_C$ that is above a predetermined threshold S. This threshold S corresponds to signal power beyond which the signal is liable to be subjected to non-linear distortion on propagating in the line fiber 12. It should also be observed that at the outlet from the emitter 10, the pulse 30 has a mid-height time width $\Delta\tau$ that is narrow.

In order to avoid non-linear distortion, the pulse 30 initially propagates in the module 14 for linearly spreading pulses, and at the outlet therefrom, at point B, the peak power $P_C$ has been lowered so as to come below the threshold S. As a consequence, the pulse 30 has been spread in time, i.e. the value of $\Delta\tau$ has increased between A and B.

Since the power of the pulse is at all times below S, the pulse can propagate in the line fiber 12 without being subjected to non-linear distortion.

Thereafter, at C, the pulse 30 has been attenuated as it propagated along the line fiber 12, such that its peak power $P_C$ has dropped to a value that requires the signal to be amplified, e.g. after 100 km.

In the amplifier module 16, the pulse 30 initially passes through the first amplifier 18, thereby increasing its peak value $P_C$. However the width of the pulse $\Delta\tau$ is not changed.

Then, the pulse propagates through the dispersion compensation module 20 so that at the outlet from this module, i.e. at point E, it reaches a peak power that is still higher, but below the threshold S, and with a width $\Delta\tau$ that had been returned to the same value as at B.

Thereafter, the pulse 30 passes through the second amplifier 18 such that at F it has the same waveform as at B.

Thereafter, at points G, H, I, and J, the pulse 30 again has the same waveforms as at points C, D, E, and F, respectively.

The diagram of FIG. 3 shows how the time width of the pulse 30 varies during propagation through the optical transmission apparatus.

Between A and B, in the module 14 for linearly spreading pulses, the pulse is spread so that its peak power is brought below the threshold S. Thereafter, between B and C, in the line fiber 12, the pulse continues to spread progressively and is also subjected to attenuation.

Between C and F, the pulse is firstly amplified by the two amplifiers 18, and secondly it is reshaped by the dispersion compensation module 20, thereby having the effect of restoring it to a time width $\Delta\tau$, i.e. the width it had at B.

Thereafter, between F and G, the pulse is subjected to the same transformations (spreading and attenuation) as between B and C in the line fiber 12. Finally, between G and J, the signal is subjected to the same reshaping as between C and F.

Since the optical transmission apparatus has amplifier modules 16 disposed regularly, e.g. once every 100 km, the signal representative of variation in pulse time width along said apparatus is a periodic signal of period (B, F).

It can clearly be seen that transmission apparatus of the invention and the corresponding transmission method enables transmission to take place without the pulses being subjected to non-linear distortion, even at a very high data rate, and in particular at rates that may reach or may exceed 160 Gbit/s.

More generally, even at lower rates, i.e. starting from 40 Gbit/s, this apparatus is particularly suited for optical transmission.

The invention claimed is:

1. Apparatus for transmitting a signal through an optical data transmission network, the apparatus comprising a pulse emitter and at least one line fiber for conveying at least one pulse in said line fiber, wherein the apparatus comprises a spreader module for linearly spreading pulses, said spreader module comprising a propagation medium that is dispersive and linear, said propagation medium being a fiber of the high order mode type or a fiber of the super large area type and presenting accumulated chromatic dispersion that is high enough to lower the peak power of the pulse to below a predetermined threshold, where a signal above said threshold is subjected to non-linear distortion in the line fiber, said spreader module being disposed between the emitter and the line fiber.

2. The transmission apparatus according to claim 1, wherein it includes a plurality of amplifier modules disposed regularly along the line fiber, each including a dispersion compensation module comprising a propagation medium that is dispersive and linear.

3. The transmission apparatus according to claim 2, wherein the dispersion compensation module comprises a fiber of the high order mode type, the super large area type, or having photonic crystals.

4. The transmission apparatus according to claim 1 for use as an optical network having a data rate of not less than 160 Gbit/s.

5. A method of transmitting a signal through an optical data transmission network, the method comprising the steps of emitting at least one pulse and of conveying said pulse via an optical data transmission network comprising at least one line fiber, wherein the method further comprises, prior to conveying the pulse to the line fiber, a step consisting in causing the pulse to be conveyed by a propagation medium that is dispersive and linear, said propagation medium being a fiber of the high order mode type or a fiber of the super large area type and presenting accumulated chromatic dispersion that is high enough to lower the peak power of the pulse to below a predetermined threshold, where a signal above said threshold is subjected to non-linear distortion in the line fiber.

6. The transmission method according to claim 5, wherein for a transmitted pulse that is amplified by amplifier modules disposed regularly along the line fiber, the pulse is conveyed within the amplifier modules in a propagation medium that is dispersive and linear in order to compensate the dispersion to which the pulse has been subjected in the line fiber.

7. The method according to claim 5, wherein said optical transmission is at a data rate of not less than 160 Gbit/s.

8. A module comprising a propagation medium that is dispersive and linear, said module being disposed between a pulse emitter and a line fiber, in order to transmit pulses into the line and to spread pulses linearly, said propagation medium being a fiber of the high order mode type or a fiber of the super large area type and presenting accumulated chromatic dispersion high enough to lower the peak power of pulses to below a predetermined threshold, above which the signal is subjected to distortion.

* * * * *